United States Patent
Spence et al.

(10) Patent No.: US 6,185,600 B1
(45) Date of Patent: *Feb. 6, 2001

(54) UNIVERSAL VIEWER/BROWSER FOR NETWORK AND SYSTEM EVENTS USING A UNIVERSAL USER INTERFACE GENERATOR, A GENERIC PRODUCT SPECIFICATION LANGUAGE, AND PRODUCT SPECIFIC INTERFACES

(75) Inventors: Kurt E. Spence; John W. Yunker, both of Fort Collins, CO (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/986,601

(22) Filed: Dec. 8, 1997

(51) Int. Cl.[7] .............................. G06F 11/30; G06F 15/00
(52) U.S. Cl. ........................ 709/203; 709/204; 709/205; 709/223; 709/224; 709/217; 709/219
(58) Field of Search ..................................... 709/203, 204, 709/205, 223, 224, 219, 217

(56) References Cited

U.S. PATENT DOCUMENTS

| | | | |
|---|---|---|---|
| 5,774,660 | * 6/1998 | Brendel et al. ........................ | 709/203 |
| 5,778,178 | * 7/1998 | Arunachalam ........................ | 709/203 |
| 5,796,393 | * 8/1998 | MacNaughton et al. ............ | 709/203 |
| 5,835,712 | * 11/1998 | DuFresne ............................. | 709/203 |
| 5,897,622 | * 4/1999 | Blinn et al. . | |
| 5,987,513 | * 11/1999 | Prithviraj et al. .................... | 709/223 |
| 6,088,717 | * 7/2000 | Reed et al. ........................... | 709/203 |

OTHER PUBLICATIONS

Drake, P., "Using SNMP to manage networks", Designing Resilient Architectures, pp. 2/1–2/4, 1991.*

Robertson et al., "Using the World Wide Web to provide a platform independent interface to high performance computing", Compcon '95. 'Technologies for the Information Superhighway', Digest of Papers., pp. 3–7, Mar. 1995.*

Chen et al., "Ciao: a graphical navigator for software and document repositories", International Conference on Software Maintenance, pp. 66–75, Oct. 1995.*

Lincoln et al., "A flexible human–computer interface for accessing and interpreting human performance data", Third Annual Symposium on Human Interaction with Complex Systems, pp. 252–259, Aug. 1996.*

Singh et al., "Impact of World Wide Web, Java, and virtual environments on education in computational science and engineering", Frontiers in Education Conference, vol. 3, pp. 1007–1010, Nov. 1996.*

* cited by examiner

*Primary Examiner*—Mark Rinehart
*Assistant Examiner*—Almari Romero

(57) ABSTRACT

A universal event browser operable for viewing and browsing network and system events for a number of different product specific applications is presented. The universal event browser isolates generic graphical user interface functionality from the implementations of the product specific applications by requiring each product specific application to have a product specific interface operable to communicate with the product specific application to retrieve event data from an event repository specific to the product. In addition, each product specific application is associated with a product specification file which contains window display configuration parameters, preferably written in a generic specification language. The universal event browser provides a universal user interface generator operable to communicate with the appropriate product specific interface to retrieve event data from the appropriate product specific event repository, and to utilize a the window display parameters from the appropriate product specification file to generate a universal interface data for use by a standard internet browser in displaying the event data.

12 Claims, 6 Drawing Sheets

| | LOCATE | ABOUT | FIRST | NEXT | PREV | LAST | HELP |
|---|---|---|---|---|---|---|---|

202

| <SEVERITY_1> | <DATE/TIME_1> | <NODE_NAME_1> | <EVENT_1> |
|---|---|---|---|
| <SEVERITY_2> | <DATE/TIME_2> | <NODE_NAME_2> | <EVENT_2> |
| . | . | . | |
| <SEVERITY_n> | <DATE/TIME_n> | <NODE_NAME_n> | <EVENT_n> |

204

206

| TOTAL | CRITICAL | MAJOR | MINOR | WARNING | NORMAL |
|---|---|---|---|---|---|
| 17416 | 1 | 0 | 0 | 17317 | 98 |

208

SEVERITY
☐ CRITICAL
☐ MAJOR
☐ MINOR
☐ WARNING
☐ NORMAL

EVENT CATEGORIES
☐ ERROR
☐ TRHESHOLD
☐ STATUS
☐ CONFIGURATION

DAYS INCLUDED [    ]

NODE NAME [    ]

UNIVERSAL VIEWER/BROWSER FOR NETWORK AND SYSTEM EVENTS USING A UNIVERSAL USER INTERFACE GENERATOR, A GENERIC PRODUCT SPECIFICATION LANGUAGE, AND PRODUCT SPECIFIC INTERFACES

FIELD OF THE INVENTION

The present invention relates generally to the field of networked computer systems, and more particularly to a system and method for viewing network event data generated by a variety of different product specific applications via a standard internet browser.

BACKGROUND OF THE INVENTION

Networked computer systems provide a convenient method for sharing data and facilitating distributed processing among multiple, and often remote, users and systems. With the increasing speed of technology, new products and systems are entering the market with an ever-increasing pace. To strike a balance between the desire to obtain the latest technological functionality available against market requirements to keep costs down, many industries maintain heterogeneous networks. A heterogeneous network is a network that is diverse across its network processing nodes in either or all of its system hardware, operating systems, and applications.

Network systems are generally monitored and maintained by system administrators. System administrators learn the state of the network system by being notified of certain system events. Typically, operating systems and certain applications executing on a network processing node store system event data which may be of interest to the system administrator in a product specific event repository. The event repository may be implemented as an ASCII error log, or may be a more sophisticated database upon which a product specific event browser is employed to view and sort the system event data.

Present day product specific event browsers are typically available from vendors of a given operating system or application. In order to view the event data stored in a given product's event repository, a user must use the vendor's product specific event browser. This may be inconvenient on a heterogeneous platform where the system administrator is running on a remote system under a different platform. Accordingly, a need exists for a universal event browser which generates a viewable system events window with desired filtering capability from a variety of different back-end products, including operating systems and applications.

SUMMARY OF THE INVENTION

The present invention provides a universal event browser which allows users to view and potentially manipulate stored network and system event data remotely via a local internet browser. According to the invention, a user may access event data generated by any number of different product specific applications using a single universal event browser.

According to the invention, an architecture is defined which isolates generic user interface functionality from the implementation of each product specific application as much as possible. Under the architecture defined by the invention, generic graphical user interface (GUI) tasks, which are not product specific, are implemented in a universal user interface generator. Data collection tasks, which are product specific since each product specific application maintains a separate and different event data store, are implemented in independent product specific interfaces defined for each product specific application. The architecture described in conjunction with the structure of the illustrative embodiments presented herein allows a host of different product specific applications to be supported by a universal event browser by providing a single front-end universal user interface generator which communicates with the user via the client's local internet browser, and a product specific interface for each product specific application (or collection of applications) which perform the actual event retrieval and communicate with the universal user interface generator via a well-defined communications protocol. This architecture complies with the database retrieval requirements of each product specific application using a minimal amount of coding; no duplicated code is required since the universal user interface generator interacts equally well with all of the product specific interfaces.

A generic specification language is also provided which allows the specific display and filtering parameters to be defined for the user's display. The vendor or developer of each product specific application defines the format of its own product specific display window by specifying the desired window and filtering parameters using the generic specification language in a product specific specification file. When a universal event browser session is launched for viewing and browsing event data generated by a product specific application, its corresponding product specific specification file is read by the universal user interface generator to determine the product specific elements of the display.

The universal event browser of the invention allows a single set of generic GUI functional applications (packaged within the universal user interface generator) to be developed and reused for multiple product specific event browsing requirements. In addition, because the various technologies specific to the generic GUI functions and to the product specific data collection functions (packaged in independent product specific interfaces) are separated, the present invention allows modifications to be made to the implementations of either set of functional applications without requiring modifications to the other set.

BRIEF DESCRIPTIONS OF THE DRAWINGS

The invention will be better understood from a reading of the following detailed description taken in conjunction with the drawing in which like reference designators are used to designate like elements, and in which:

FIG. 2 is an illustrative embodiment of a user window display in accordance with the invention;

DETAILED DESCRIPTION OF THE PRESENT INVENTION

Figure 1:
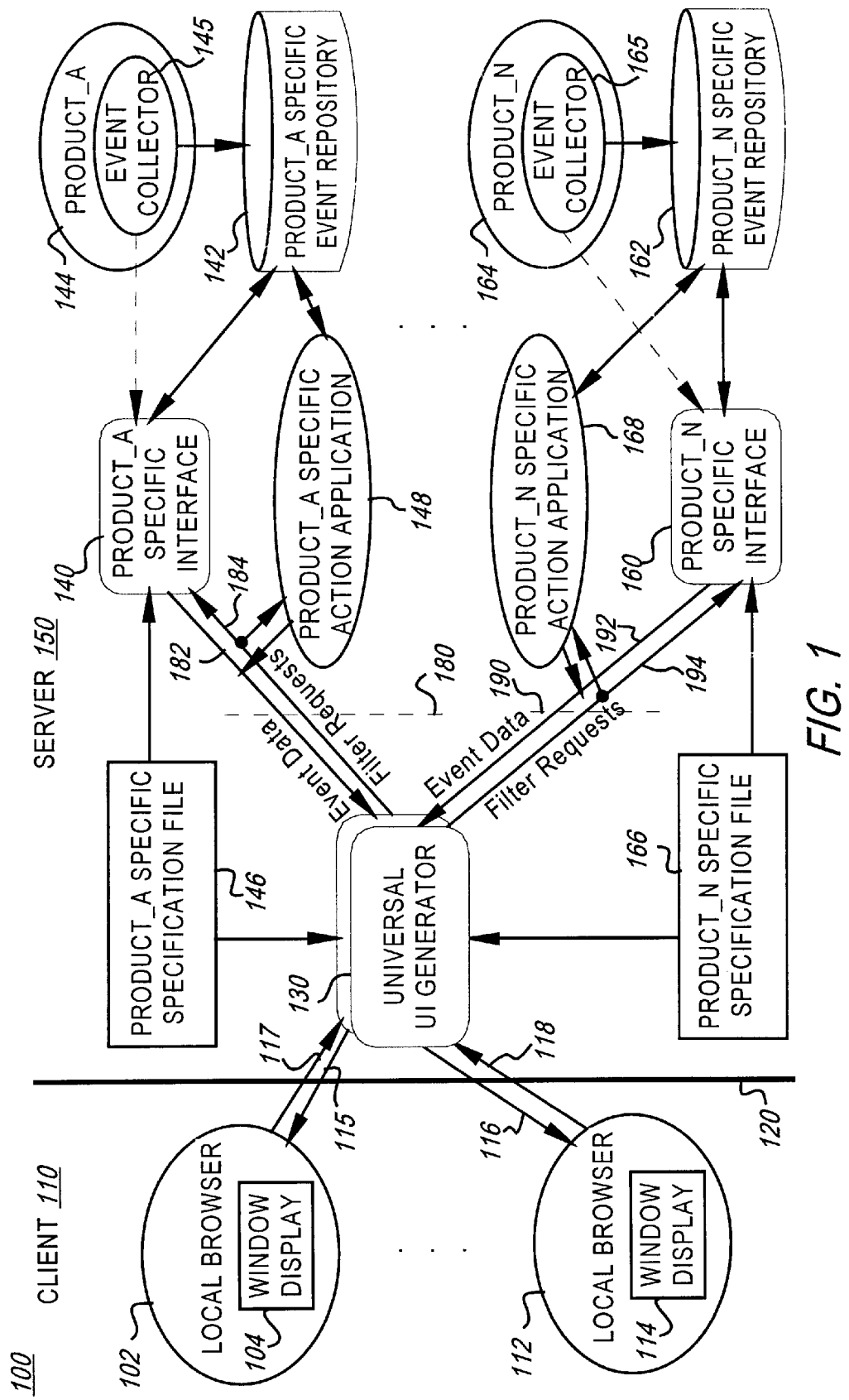
FIG. 1 is a block diagram of a system in which the universal event browser of the present invention operates.

FIG. 1 is a block diagram illustrating a preferred embodiment architecture of the universal event browser of the present invention. In the embodiment shown in FIG. 1, the components of the universal event browser all reside on an internet server network processing node, hereinafter server 150, while a user accesses the universal event browser via a local browser 102, 112 on a client network processing node 110. It will be appreciated by those skilled in the art that the server and client may coexist on the same network processing node, and alternatively, that each component of the universal event browser may be distributed across any number of different network processing nodes and communicate remotely.

As shown in FIG. 1, the architecture of the universal event browser includes a universal user interface generator 130, one or more product specific interfaces 140, 160, one or more product specific event repositories 142, 162 corresponding to one or more product specific applications 144, 164, and one or more product specification files 146, 166. The architecture may also include one or more product specific action applications 148, 168.

Universal user interface generator 130 creates and sends universal interface data 115, 116 to local browser 102, 112 executing on client 110. In a first illustrative embodiment, the universal interface data 115, 116 comprises HyperText Markup Language (HTML) data which is sent to local browsers 102, 112 via a Common Gateway Interface (CGI) 120. HTML and CGI are both universally supported by commercial internet servers and browsers. In the first illustrative embodiment, a HyperText Transport Protocol (HTTP) cookie (i.e., a state-saving mechanism built into commercial internet browsers and servers) maintains the name of the product specific application, and the particular product's corresponding product specification file 146, 166, discussed hereinafter, is referenced to determine the exact names and placements of the window display elements for the particular user context.

In a second illustrative embodiment, universal user interface generator 130 is implemented with one or more JAVA applets (i.e., a program written in Java to run within a Java-compatible web browser, such as Netscape Navigator). Java is a well-known object-oriented programming language developed by Sun Microsystems. Multiple Java applets and their associated files can be bundled into a Java Archive file and downloaded to a local internet browser in a single HTTP transaction. In this second illustrative embodiment, a Java applet reads the appropriate product specific specification file 145, 166 to determine the display parameters of the display window.

Preferably, the window display 104, 114 of the universal event browser includes four main user interface regions. FIG. 2 is an example of a user window display 200 in accordance with the invention, illustrating each of the preferred regions. As shown in FIG. 2, these regions preferably include a toolbar region 202, an event table region 204, a navigation region 206, and a summary region 206. The toolbar region 202 presents any product specific actions, displayed as graphical icons, for user interaction. As shown in FIG. 2, toolbar region 202 includes graphical icon action buttons Locate, About, First, Next, Prev, Last, and Help, which respectively invoke actions for locating a specific text in the current document, showing the product name, version, license, and copyright information, retrieving the first page, next page, previous page, and last page, and invoking a help application. Universal user interface generator 130 interprets the actions defined in the product specific specification file 140, 160, and places the appropriate buttons, using the desired implementation technology, in the toolbar region 202 to invoke the desired product specific action. In the first illustrative embodiment discussed above, the toolbar region is preferably implemented as an HTML table that defines the buttons and their CGI action definition (formed as a Uniform Resource Locator URL), where the recipient of an action is a product specific application. In the second illustrative embodiment discussed above, toolbar action buttons are preferably implemented using Java.

Event table region 204 is the main area of the universal event browser display window 104, 114 in which the event data is actually displayed. This could be implemented as an HTML table, a Java element, or an appropriate construct specific to the particular implementation of the universal user interface generator 130. The events list is a major portion of the window which preferably includes a scrolling region containing a table of current event data, with each column labeled as, and representing, a particular field. A graphical user interface (GUI) mechanism is preferably provided to indicate that one or more events (rows of the table) are selected. This table is preferably cached by either the universal user interface generator 130 (i.e., stored as part of the user's context) or by the product specific interface 140, 160 such that only a configurable number of event entries are loaded into the event table region per fetch by toolbar action buttons First, Next, Prev and Last. This caching improves performance to the client.

Navigation region 206 provides filtering options which allow a user to select among product developer defined filters to change the data presented in the event table region 204. The navigation region 206 in FIG. 2 illustrates example filtering options, including various levels of event severity, various event types, date ranges, and network node names.

Summary region 208 displays a table populated with product developer defined summary values. Example summary values may include the total number of events captured, total number of events captured in each severity level (as shown in FIG. 2), total number of events captured of each type, total number of events captured on each network processing node.

Figure 3:
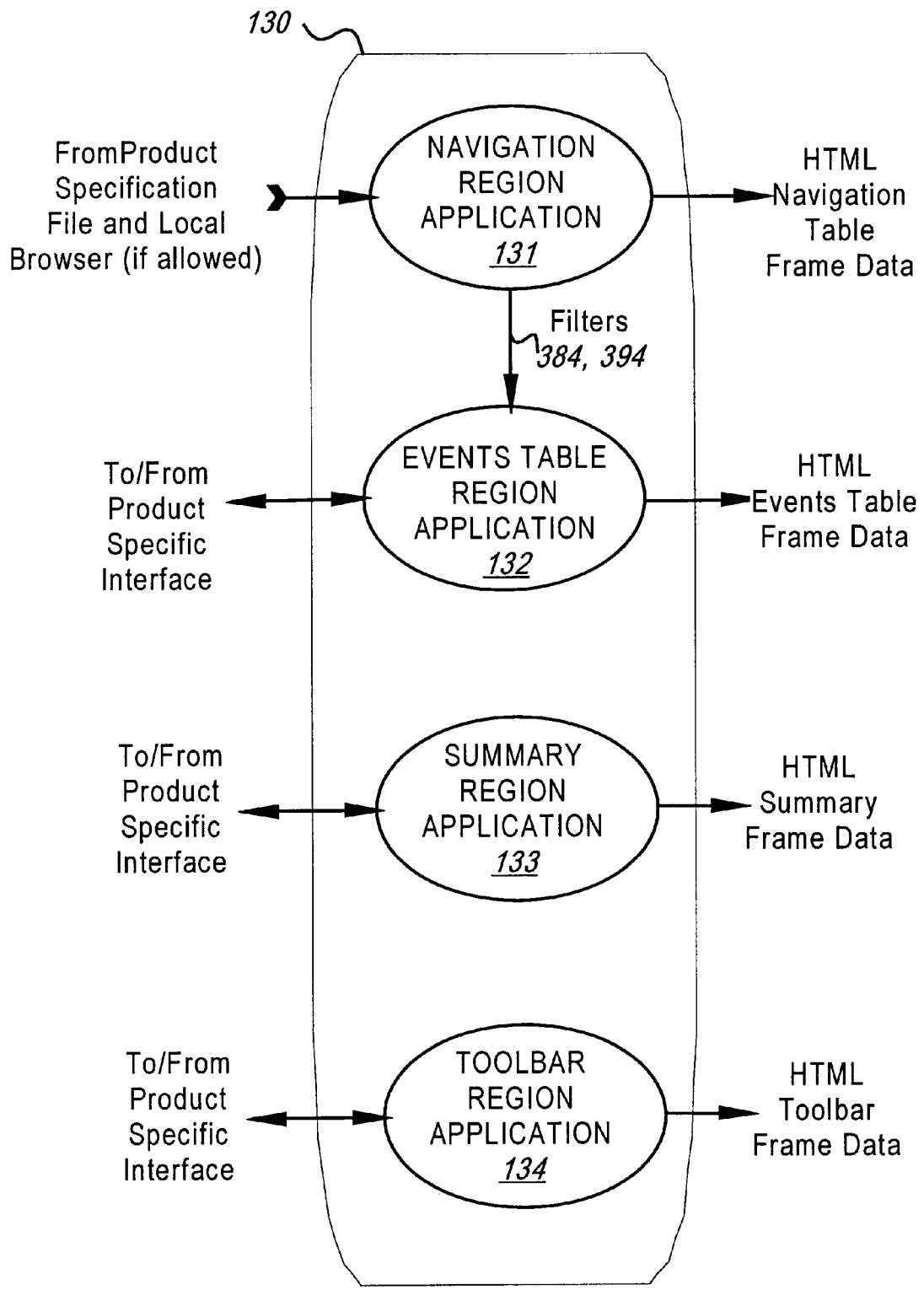
FIG. 3 is a functional diagram of a first illustrative embodiment of a universal user interface generator.

FIG. 3 is a first illustrative embodiment of one instance of a universal user interface generator 130, which includes a set of generic GUI functional applications. The structure and independence of each functional application lends itself well to implementation in an object-oriented language, such as C++; however, as known by those skilled in the art, the functionality provided by each functional application may be implemented in virtually any desired programming language. The embodiment shown in FIG. 3 includes separate functional applications for each display window region, including a navigation region application 131, an events table region application 132, a summary region application 133, and a toolbar region application 134. Preferably, the events table application 132 and summary table application 133 communicate with the product specific interface 140, 160 appropriate to the user's context via the well-known Inter-Process Communication (IPC) protocol to receive product specific event data 182, 192. In one embodiment, HTTP client-pull is implemented to regularly be invoked by the web server to re-fetch event data 182, 192 from the product specific interface 140, 160.

Navigation region application 131 retrieves product specific filters from the product developer defined specification file 146, 166, and, if allowed, user selected filters retrieved from the user's local browser 102, 104, and sends filter requests 384, 394 via HTTP to the Events table application, which sends the filter requests 184, 194 to, and receives new filtered event data 182, 192 from, the appropriate product specific interface 140, 160.

Figure 4:
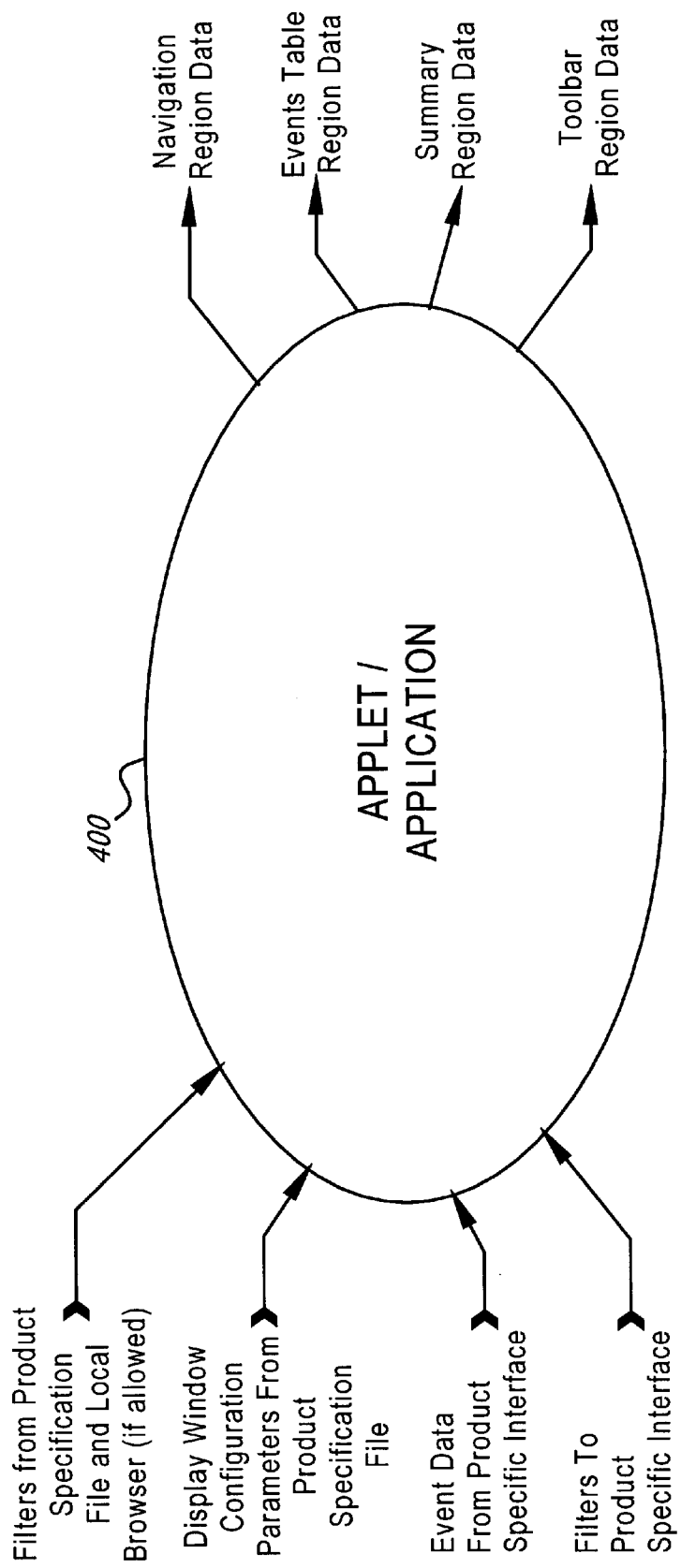
FIG. 4 is a functional diagram of a second illustrative embodiment of a universal user interface generator.

FIG. 4 is a second illustrative embodiment of one instance of a universal user interface generator 130, which includes a Java applet 400 which implements the generic GUI functions.

Universal interface generator 130 communicates with the product's corresponding product specific interface 140, 160, preferably using the well-known inter-process communication (IPC) protocol, for the retrieval of event data stored in the product's corresponding product specific event repository 156.

In operation, product specific interface 140, 160 is forked when the universal event browser of the invention is first accessed, and runs for the entire duration of the universal event browser session (i.e., it is not a CGI application bound by invocation by the internet server 150). Each product specific interface 140, 160 is configured to interact with the an event collector means 145, 165 implemented in the appropriate product specific application 144, 164 to collect product event data, format the data as described by the IPC protocol, and send requested event data 182, 192 to the universal user interface generator 130 via an IPC socket 180, 190. Product specific interface 140, 160 is preferably configured to send events which are newly added to the product specific event repository to universal user interface generator 130 in realtime. Product specific interface 140, 160 is also configured to receive filter requests 184, 194 from universal user interface generator 130, which are received by universal user interface generator 130 by the user via the user's local internet browser 102, 112, acts upon the request, and returns any indicated event data 182, 192.

In one embodiment, product specific interface 140, 160 maintains an internal cache of all event data from its corresponding product's event repository 142, 162 that match the filter requests 184, 194. This cache is re-created each time the filtering criteria changes. This component implements cache paging to return a default number of events when it is requested by the events table region application 132. Along with the cache, product specific interface 140, 160 also maintains the state of currently selected events (i.e., the selected events in the events table region 204 of the user's window display 104, 114) so that product specific action applications 148, 168 can request actions to be performed on the selected events. Product specific interface 140, 160 also maintains an integer array of all product defined summary values and returns this array when it is requested by the summary region application 133.

Product specific action applications 148, 168 perform product specific actions or retrieve specific information from the product's corresponding event repository 142, 162. Product specific action applications 148, 168 preferably use the same socket 180, 190 and IPC protocol for communication with the product specific interface 140, 160, and are preferably assigned to toolbar region action buttons. Product specific action applications 148, 168 may be implemented using CGI scripts. The CGI scripts access a port of product specific interface 140, 160 through a cookie and uses the cookie to gather login information. Product specific action applications 148, 168 may also be implemented using Java applets or applications, or any other suitable technology that interfaces with the internet browser. An illustrative product specific action application 148, 168 provides a product specific details window and acts upon users' requests. Product specific action applications 148, 168 preferably do not directly modify a product specific event repository 142, 162, although they can be configured to cause the product specific event repository 142, 162 to change through calls to the corresponding product's APIs which may trigger events that are captured by the product specific event collector 145, 165. In FIG. 1, product specific action applications 148, 168 are illustrated as separate entities; however, the functionality of product specific action applications 148, 168 may alternatively be implemented within the appropriate product specific interface 140, 160 itself.

Product specific event repository 142, 162 stores event data captured by an event collector 145, 165 implemented in and by its corresponding product specific application 144, 164.

Figure 5:
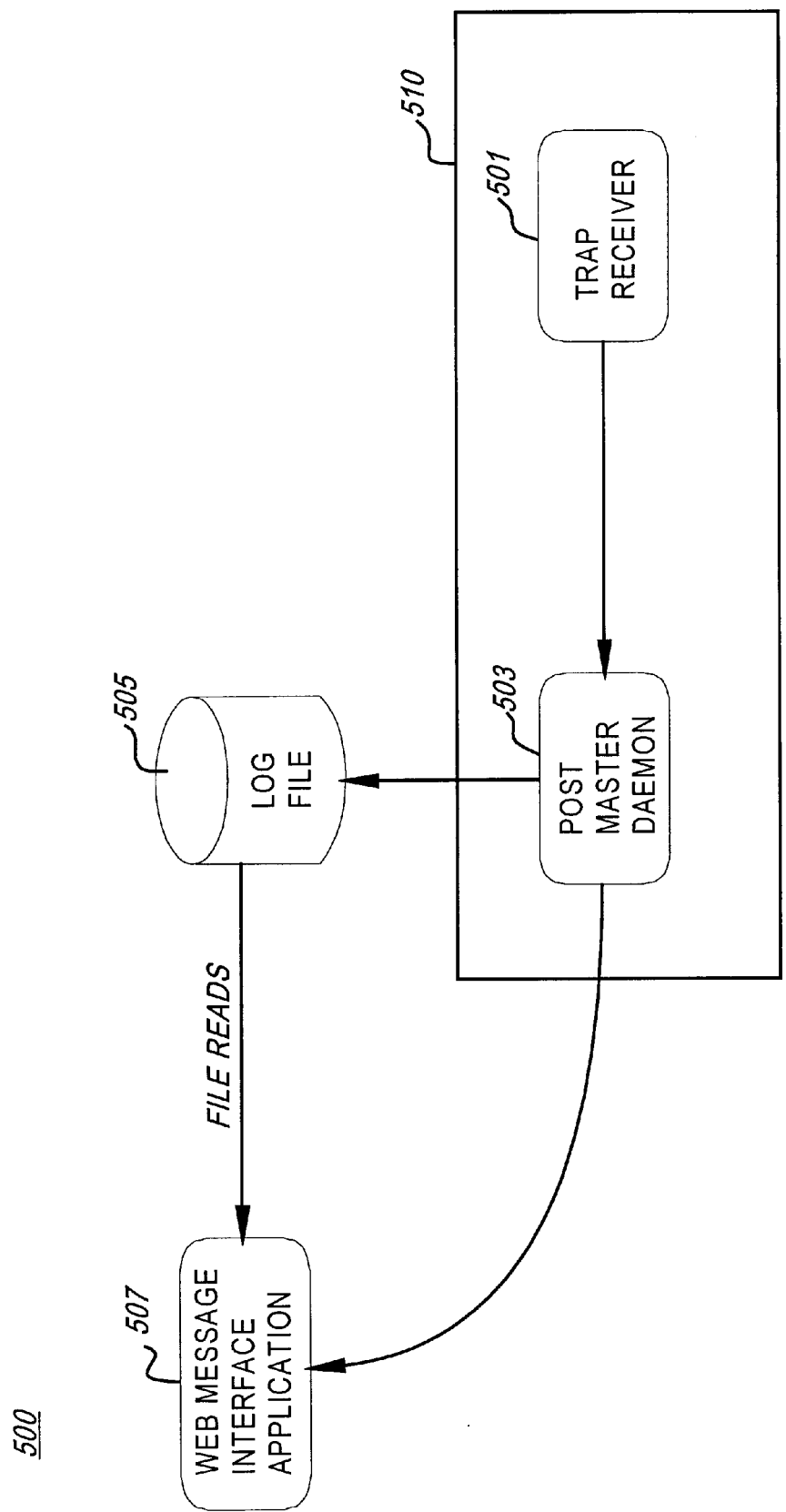
FIG. 5 is a block diagram illustrating an example embodiment for collecting event data.

FIG. 5 is a block diagram illustrating a process performed by an example product specific application 510 for collecting event data. In this example, event occurrences trigger a trap routine 501 which is implemented in product specific application 510. As shown in FIG. 5, trap routine 501 invokes an event manager routine 503, which is preferably implemented in product specific application 510, and which performs any necessary event data formatting and deposits the formatted event data into its product specific event repository 505. The product specific interface 507 corresponding to product specific application 510 reads events from the product specific event repository 505. Product specific interface 507 scans its product specific specification file (not shown) filter requests specific to the product specific application.

Figure 6:
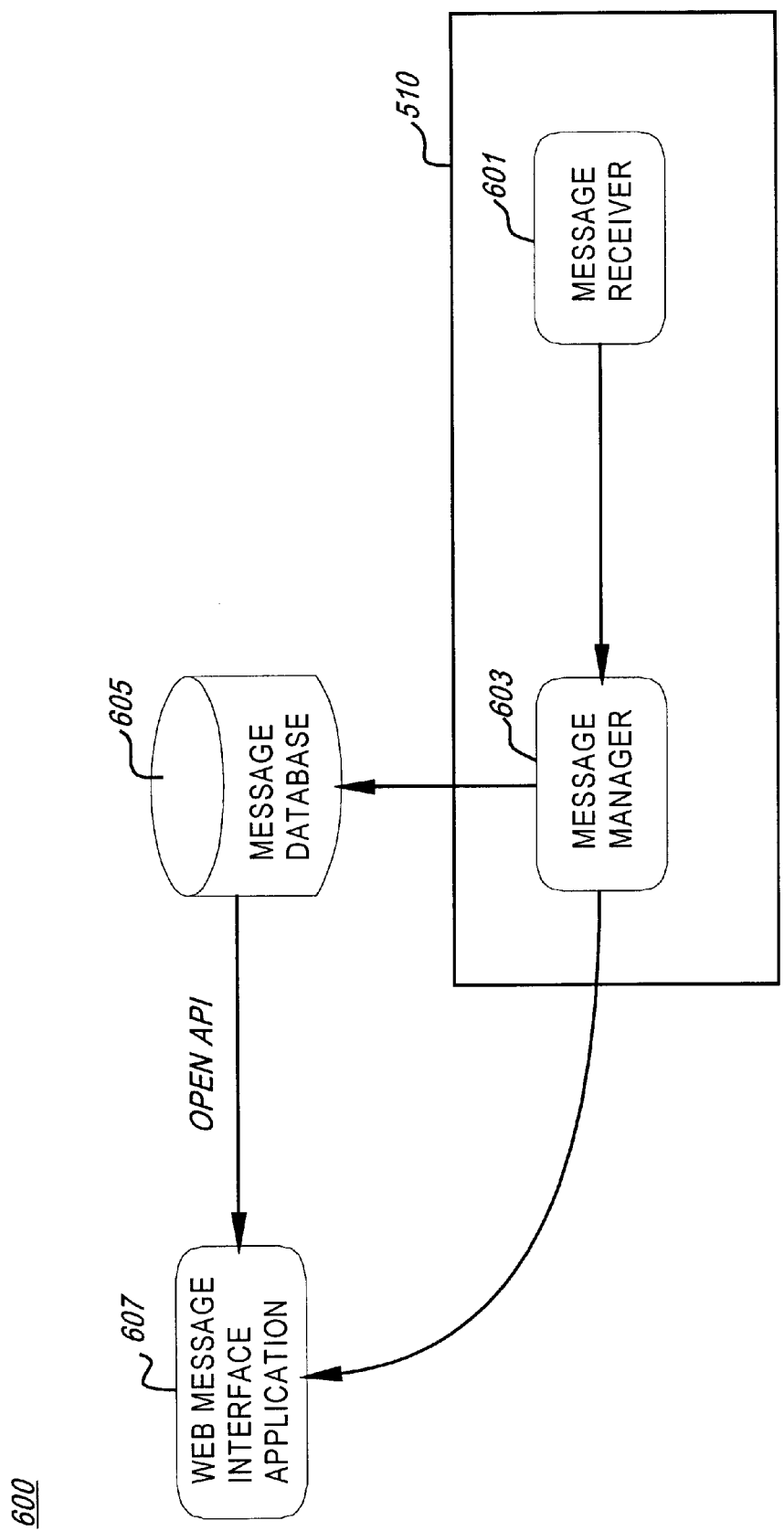
FIG. 6 is a block diagram illustrating another example embodiment for collecting event data.

FIG. 6 is a block diagram illustrating a process performed by an alternative example product specific application 610 for collecting event data. In this example, product specific application 610 is implemented using an object-oriented language which supports API method calls. When an event occurs, a Message Event API 601 invokes a Message Manager 603, both preferably implemented within product specific application 610, which performs any necessary event data formatting, and deposits the formatted event information into product specific event repository 605. Product specific application 610 also implements an Event Retrieve API 606 for retrieving event data from product specific event repository 605. The product specific interface 607 corresponding to application 610 utilizes the product specific application's Event Retrieve API 606 to retrieve events from the product specific event repository 605.

Product specific specification files 146, 166 specify the colors of fields, enumerated types used in fields, and related event information which is used for formatting the window display 104, 114 in the user's local browser 102, 112. Preferably, product specific specification files 146, 166 are implemented using a generic specification language in ASCII format and located in a standard location on server 150.

A generic specification language is employed to implement the product specification files 146, 166. The generic specification language defines the potential colors of fields, the potential enumerated types used in fields, and the related event information, including the maximum number of event entries displayed, the field declarations, the filters that can be used on the event data, the possible sortings of the event data, the status fields displayed about the event data, actions which can be performed on the event data, and the toolbar buttons used to perform actions. The information in the generic specification language is preferably arranged in data structures which may then be used by the product specific interface 140, 160 and universal user interface generator 130. The structures are lists and counts of the number of elements in the lists. The lists are for color, enumerated types, and events specifications. TABLE C illustrates an example embodiment of the generic specification language.

Each product specific specification file 146, 166 typically specifies different display window parameters. An illustrative example of the type of information specified in a product specific specification file 146 defined by a developer of one product specific application 144 (PRODUCT_A) is shown below in TABLE A.

TABLE A

| Region | Possible Select Values |
| --- | --- |
| list columns (fields) | acknowledged, severity, date/time, source, message |
| sort criteria | only & always by severity |
| filter criteria | severity, acknowledged, time received before, time received after, source, message text |
| summary values | total event, total critical, total major, total minor, total warning, total normal |

An illustrative example of the type of information specified in a product specific specification file 166 defined by a developer of one product specific application 164 (PRODUCT_N) is shown below in TABLE B.

TABLE B

| Region | Possible Select Values |
| --- | --- |
| list columns (fields) | severity, flags, date, time, node, application message group, object, message text |
| sort criteria | only & always by severity |
| filter criteria | severity, time, owned-state, description text |
| summary values | total critical, total major, total minor, total warning, total normal, total unknown, total owned-by-me, total owned- by-other |

The operation of the universal event browser is as follows.

At startup, universal user interface generator 130 sends a filter request 184, 194 requesting that no filters be applied, which causes product specific interface 140, 160 to send an initial list of event data 182, 192 via an IPC socket 180, 190. The format of the initial list of event data is determined by the definition in the product specific specification files 146, 166. Universal user interface generator 130 formats the initial list of event data, and then retrieves the filter selections specified by the user and passes the filter requests 184, 194 to product the appropriate specific interface 140, 160 via IPC socket 180, 190. Universal user interface generator 130 receives the filtered event data 182, 192 from product specific interface 140, 160 via IPC socket 180, 190, formats the filtered event data, and sends the filtered event data to a requesting local browser 102, 112. Universal user interface generator 130 updates the event table region with appropriately filtered newly obtained event data as new event data is generated by the product specific application and deposited in the corresponding product specific event repository.

The invention as herein described provides the advantages of separating generic user interface tasks in an events browser from product specific tasks. This architecture facilitates the implementation of a universal event browser which allows a user to view or browse event data generated by any number of different product specific applications from a single local internet browser. This is facilitated by implementing the generic user interface tasks into a universal user interface generator which reads product specific specification files implemented using a generic specification language and communicates with product specific interfaces to obtain formatting information and event data, and which processes the information in the product specific specification files to generate universal interface data from which a local browser may display the event data in the desired format.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

TABLE C

| Name | Definition |
| --- | --- |
| Color Specifications: | |
| color: | COLOR id [X11_ColorName | RR/GG/BB]; id is an internal identifier for the specified color to be used when defining an enumerated type or when defining a field. The color specification's actual color value is defined by either the X11_ColorName specified or by the hex RR/GG/BB value entered. The color specification is used to define a color to be used by the event browser. |
| Enumerated Type Specifications: | |
| enum | ENUM id {enum_list}; id is an internal identifier used to identify the type. enum_list is a comma separated list of enumerated string names and an optional color specifications for that enumeration. Ex. catgets(clog, msg, "default") [=id] clog is the set number in the message catalog, msg is the message number in the message catalog. "default" is the default string to be used if the catalog cannot be used. The id which is optionally specified is a legitimate identifier used to reference a color specification. |
| Event Specification: | |
| Return Page Size | MAXLOAD integer_value; Allows the event browser GUI to only load the specified number of events into the Events region, where the specified value is integer_value. |
| Fields | FIELD data_type field name "FieldTitle" [ COLOR = id | ACTION = id | HIDDEN | NOTEXT]; data_type is the declared data type of the field. The possible values are: integer, float string, data, and enum. field_name is an internal name used to uniquely identify the field to the PSI and UI applications. To internationalize the catalog, message catalogs are used for local-specific strings. For example, in the above field definition line, the title would have the form: catgets(catalog, msg_id, "FieldTitle"). All displayed strings found in the specification file are localized with catgets. The remaining options affect the display of the specified field their behavior is defined for as follows: COLOR = id This specifies the color of the field header and all of its values. ACTION = id This specifies an action to activate when the field is double-clicked. HIDDEN This causes the UI application to not display the field. This is used to pass unique event identifiers which are not normally seen by the end user. NOTEXT This option is useful for enumerated fields when each enumeration value has a color value defined. It tells the UI application to only display the associated color ball, and NOT the enumerated text. |
| filters | FILTERGROUP id filtergroup_title { filter_specifications }; A filter specification is defined within a filter group construct. Filter groups are created to provide logical groupings of filter specifications id is an internally used identifier for the filter group. "filtergroup title" is a label for the associated filter group. There can be any number of filter_specifications in a filter group. |

TABLE C-continued

| Name | Definition |
|---|---|
|  | The format of a filter_specification is:<br>FILTER id "filter label" logical_expression;<br>id is an internal identifier used to specify a filter.<br>Sending this filter id is how the UI applications request that the filter should be applied by the PSI.<br>"filter label" is the label presented by the UI generator. It uniquely identifies the filter to the end user.<br>A logical expression is used for defining filters and for defining status items. Logical expressions are combinations of field ids, logical operators, and potential field values. |
| sorts | A sort specification is defined within a sort group construct. Sort groups provide logical groupings of sort specifications.<br>SORTGROUP id Sort Group Title<br>{<br>sort_specifications<br>};<br>id is an internal id for the sort group.<br>Sorting groups and Sort Items are not currently displayed by the UI applications. The PSI looks at sort items and applies them, but the end user cannot ask for a specific filter to be applied.<br>A sort_specification is defined as follows:<br>SORT id field_name "Sort_label" sort_direction;<br>"Sort Label" is displayed as the label for the sort.<br>sort_direction is either the value INCREASING or the value DECREASING, which indicates the direction of the sort.<br>The sort is based on the field type. Integers, floats, strings, and dates have well defined sortings. The enumerated types are sorted in the order they are declared. |
| status-line items | A status line specification is defined within a status line group construct. Status line groups are created to provide logical groupings of status specifications.<br>STATUSLINEGROUP id "Status Line Group Title"<br>{<br>status_line_specifications<br>};<br>id is an internal identifier for the status line group.<br>"Status Line Group Title" is displayed at the bottom of the status line group. It is placed at the bottom so that the status line information is displayed more prominently.<br>The format for a status_line_specification follows:<br>STATUSLINE id Status_Line_Title logical_expression;<br>id is an internal identifier for the status line.<br>"Status Line Title" is the label displayed over the status information.<br>logical_expression is an expression which is used to select elements of event data. The total number of selected elements are returned to the PSI to be displayed by the UI application as a value in the status line areas. |
| actions | An action specification is used to define actions which can be performed on the event data. An actions can be either a URL reference or a command to be executed along with the specified fields which are passed to the action. The format for an action specification is:<br>ACTION id action_type action string field1 . . . fieldN;<br>id is an internally used identifier for the action.<br>action_type is either URL if the following action string is a URL or COMMAND if the following action string is a command to execute.<br>action string is the actual URL or command line to execute.<br>When an item is selected the field1 . . . fieldN is passed to the executing command or URL. A command processes these values as arguments, and a URL appends the parameters to the string with the "URL?field_id1 = field1& . . . &field_idN = fieldN" format, where URL is the action_string. |

What is claimed is:

1. A universal event browser for a computer network, comprising:

a first product specific interface, executing separately from a first product specific application, operable to retrieve a first set of system event data from a first product specific event repository, said first product specific event repository storing system event data that is indicative of the state of said computer network and that is generated by said first product specific application; and a universal user interface generator operable to retrieve event data from a plurality of different product-specific interfaces, said universal user interface generator operating to retrieve said first set of system event data from said first product specific interface and to utilize a first set of window display parameters to generate a first set of universal interface data for use by a first internet browser in displaying a first window display form, said first set of universal interface data complying with a universally recognized user interface format.

2. A universal event browser in accordance with claim 1, comprising:

a first product specification file comprising said first set of window display parameters set forth in a generic specification language;

wherein said universal user interface generator is operable to read said first product specification file to retrieve said first set of window display parameters.

3. A universal event browser in accordance with claim 1, comprising:

said first internet browser operable to receive said universal interface data, to generate said first window display form, and to display said first set of event data in said first window display form.

4. A universal event browser in accordance with claim 1, comprising:

a second product specific interface operable to communicate with a second product specific application to retrieve a second set of event data from a second product specific event repository; and a universal user interface generator operable to retrieve said second set of event data from said second product specific interface and to utilize a second set of window display parameters to generate a second set of universal interface data for use by a second internet browser in displaying a second window display form, said second set of universal interface data complying with said universally recognized user interface format.

5. A universal event browser in accordance with claim 4, comprising:

a second product specification file comprising said second set of window display parameters set forth in said generic specification language;

wherein said universal user interface generator is operable to read said second product specification file to retrieve said second set of window display parameters.

6. A universal event browser in accordance with claim 4, comprising:

said second internet browser operable to receive said universal interface data, to generate said second window display form, and to display said second set of event data in said second window display form.

7. A universal event browser in accordance with claim 1, wherein:

said universal user interface generator comprises:
a window frame generator operable to obtain and process said first set of window display parameters to generate a first set of window display data, said first set of window display data being formatted to comply with said universally recognized user interface format;

an event table frame generator operable to retrieve said first set of event data from said first product specific interface, and to process said first set of event data and said first set of window display parameters to generate a first set of event table frame data, said first set of event table frame data being formatted to comply with said universally recognized user interface format; and said first set of universal interface data comprising said first set of window display data and said first set of event table frame data.

8. A universal event browser in accordance with claim 2, wherein:

said universal user interface generator comprises:

a window frame generator operable to obtain and process said first set of window display parameters to generate a first set of window display data, said first set of window display data being formatted to comply with said universally recognized user interface format;

an event table frame generator operable to retrieve said first set of event data from said first product specific interface, and to process said first set of event data and said first set of window display parameters to generate a first set of event table frame data, said first set of event table frame data being formatted to comply with said universally recognized user interface format; and said first set of universal interface data comprising said first set of window display data and said first set of event table frame data.

9. A universal event browser in accordance with claim 1, comprising:

an update protocol between said universal user interface generator and said first product specific interface wherein:

said first product specific interface retrieves a first set of new event data when said first set of new event data is deposited into said first product specific event repository by said first product specific application; and said universal interface generator retrieves and processes said first set of new event data to generate a first set of new universal interface data formatted to comply with said universally recognized user interface format, said first set of new universal interface data for updating said first display window displayed by said first internet browser.

10. A universal user interface generator for use in a networked computer system, said networked computer system executing a first product specific application which generates and deposits system event data that is indicative of the state of said computer network in a first product specific event repository and comprising a first product specific interface, executing separately from said first product specific application, operable to retrieve event data from a plurality of different product-specific interfaces, said universal user interface generator operating to retrieve first requested system event data from said first product specific event repository, said universal user interface generator comprising:

a window frame generator operable to obtain and process a first set of window display parameters to generate a first set of window display data, said first set of window display data being formatted to comply with a universally recognized user interface format for display in a first display window by a first internet browser;

an event table frame generator operable to retrieve said first requested system event data from said first product specific interface, and to process said first requested event data and said first set of window display parameters to generate a first set of system event table frame data, said first set of system event table frame data being formatted to comply with said universally recognized user interface format for display in said first display window by said first internet browser.

11. A universal user interface generator in accordance with claim 10, wherein:

said window frame generator is operable to read a first product specific specification file which stores said first set of window display parameters in a generic specification language to obtain said first set of window display parameters.

12. A universal user interface generator in accordance with claim 11, wherein:

said networked computer system executes a second product specific application which generates and deposits a second set of event data in a second product specific event repository and comprises a second product specific interface operable to retrieve a second set of requested event data from said second product specific event repository;

said event table frame generator is operable to retrieve said second set of requested event data from said second product specific interface, and to process said second set of requested event data and a second set of window display parameters to generate a second set of event table frame data, said second set of event table frame data being formatted to comply with said universally recognized user interface format for display in a second display window by a second internet browser.

* * * * *